(12) United States Patent
Shuman

(10) Patent No.: US 6,715,346 B2
(45) Date of Patent: Apr. 6, 2004

(54) ATOMIC FORCE MICROSCOPY SCANNING METHODS

(75) Inventor: David James Shuman, Wappingers Falls, NY (US)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/218,449

(22) Filed: Aug. 13, 2002

(65) Prior Publication Data

US 2004/0031315 A1 Feb. 19, 2004

(51) Int. Cl.[7] .............................. G01B 5/28; G01B 7/26
(52) U.S. Cl. ........................ 73/105; 250/306; 250/307
(58) Field of Search ........................... 73/105; 250/306, 250/307, 442.11

(56) References Cited

U.S. PATENT DOCUMENTS

| | | | |
|---|---|---|---|
| 5,186,041 A | * | 2/1993 | Nyyssonen ................... 73/105 |
| 5,283,442 A | * | 2/1994 | Martin et al. ............... 250/307 |
| 5,347,854 A | * | 9/1994 | Martin et al. ................. 73/105 |
| 5,528,033 A | * | 6/1996 | Lo et al. ..................... 250/307 |
| 6,057,547 A | | 5/2000 | Park et al. |
| 6,130,427 A | | 10/2000 | Park et al. |
| 6,181,097 B1 | | 1/2001 | Li et al. ...................... 318/592 |
| 6,244,103 B1 | * | 6/2001 | Berghaus et al. ............. 73/105 |
| 6,265,718 B1 | | 7/2001 | Park et al. |
| 6,437,343 B1 | | 8/2002 | Okazaki et al. |
| 6,441,371 B1 | | 8/2002 | Ahn et al. |
| 6,520,005 B2 | * | 2/2003 | McWaid et al. ............... 73/105 |

* cited by examiner

*Primary Examiner*—Daniel S. Larkin
(74) *Attorney, Agent, or Firm*—Slater & Matsil, LLP

(57) ABSTRACT

A method of scanning a deep feature using an atomic force microscopy (AFM) tip, which includes: locating and mapping the deep feature with a surface survey scan; analyzing the scan data to identify an initial optimum location; moving the AFM tip to the initial optimum location; and repeating a first procedure until the AFM tip reaches a bottom of the deep feature, which includes: (a) lowering the AFM tip in a first direction by a first distance increment; (b) measuring atomic force interactions exerted on the AFM tip to determine whether the bottom of the deep feature has been reached; (c) moving the AFM tip in a geometric pattern and within a current plane; (d) measuring atomic force interactions exerted on the AFM tip at various locations in the geometric pattern to determine a new optimum location where the atomic force interactions are minimum; and (e) moving the AFM tip to the new optimum location, repeating (a–e) until bottom has been reached, (f) then measure the depth.

19 Claims, 9 Drawing Sheets

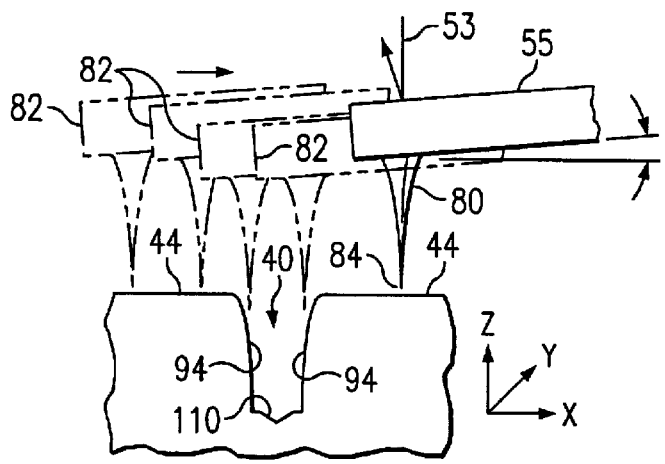
FIG. 8
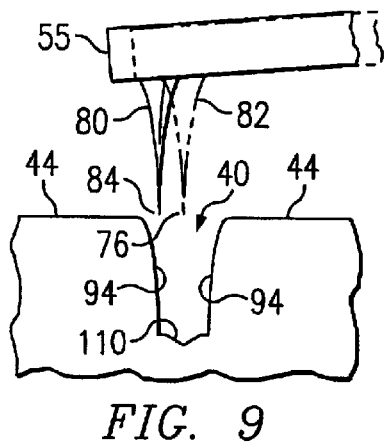
FIG. 9
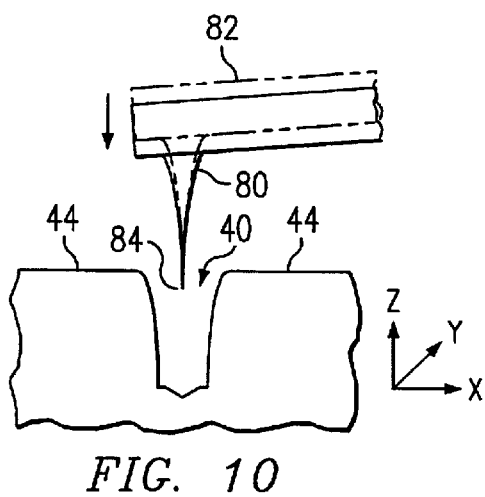
FIG. 10
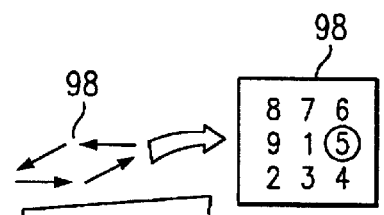
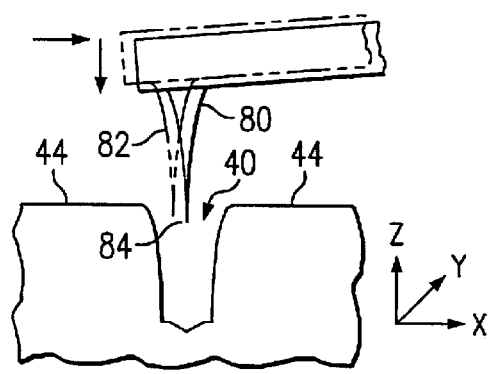
FIG. 11
FIG. 12

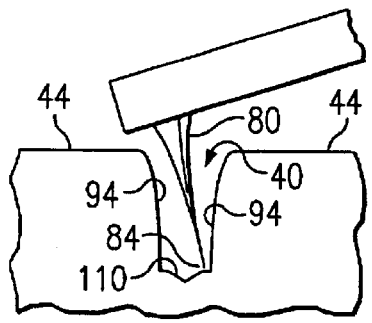
FIG. 21
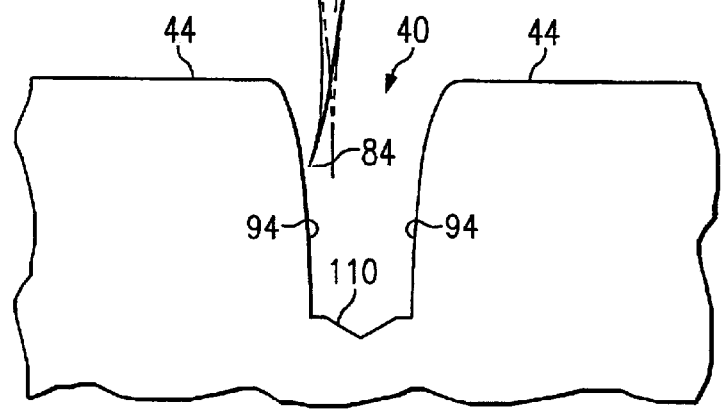
FIG. 22
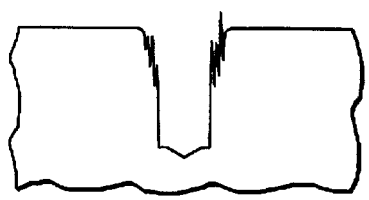
FIG. 23
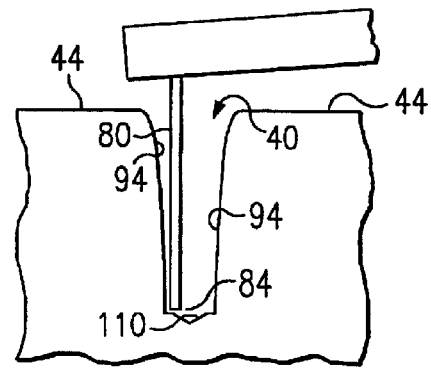
FIG. 24

ATOMIC FORCE MICROSCOPY SCANNING METHODS

TECHNICAL FIELD

The present invention relates to atomic force microscopy. In one aspect, it relates to atomic force microscopy scanning methods that may be useful for evaluating deep features of semiconductor products.

Background of the Invention

Atomic force microscopy (AFM) probes are often used to evaluate and measure features on a semiconductor product as the semiconductor product is being developed or fabricated into an integrated circuit device, for example. Conventional AFM probes typically include a silicon cantilever beam with a silicon tip ("AFM tip") extending perpendicular to or at a slight angle (e.g., 10 degrees) relative to the cantilever beam. The tip is often formed into a long and thin rod. The silicon tip is often etched to form a sharp apex small enough to fit into a deep feature. There are several high aspect ratio tips on the market made for imaging and measuring deep narrow features. Some high aspect ratio tips are made using a focused ion beam to machine the silicon tip into a long thin rod with an aspect ratio between 7:1 and 10:1. Hence, an AFM tip with a 10:1 aspect ratio (i.e., length:diameter) may be able to reach 1000 nm into a 100 nm diameter trench. Other high aspect ratio tips may be formed using electron beam deposition (e.g., EBD tips) or may be carbon nanotubes with a diameter between 10 nm and 80 nm, for example.

The AFM tip is sometimes scanned across a sample surface to create an image of the detected surface features. Special tips are often made having a high aspect ratio, which allows them to be lowered into small diameter features without touching the sidewalls.

As technology progresses, the features of integrated circuits typically become smaller, and in some cases, deeper. Thus, the demands on the size and precision of movement of AFM probe tips tends to increase as well. Problems that often occur in use of such AFM probes include rapid wear of the AFM tip and breaking the AFM tip. Such wear often occurs when the AFM tip hits a sidewall, sticks in a steep surface, or is dragged across a sidewall or surface while maneuvering the AFM tip. AFM probe cost and tool downtime makes it desirable to extend the usable life of an AFM tip. Hence, there is a need for a way to reduce AFM probe tip wear and extend the usable life of an AFM probe. The production of semiconductors often requires measurements of small-diameter, deep features. Hence, there is also a need to reduce AFM tip wear, and AFM tip sticking, while increasing the AFM depth measurement.

SUMMARY OF THE INVENTION

The problems and needs outlined above are addressed by certain aspects of the present invention. In accordance with one aspect of the present invention, a method of scanning a deep feature extending into a surface using an atomic force microscopy (AFM) tip is provided. The method includes the following steps. First, the deep feature is located and mapped with a surface survey scan. Second, data from the surface survey scan is analyzed to identify an initial optimum location for probing into the deep feature with the AFM tip. Third, the AFM tip is moved to the initial optimum location approximately at surface level. Fourth, a first procedure is repeated until the AFM tip reaches a bottom of the deep feature. The first procedure includes the following steps: (i) lowering the AFM tip in a first direction parallel with a first axis extending into the deep feature by a first distance increment; (ii) measuring atomic force interactions exerted on the AFM tip to determine whether the bottom of the deep feature has been reached; (iii) moving the AFM tip in a geometric pattern and within a current plane at a current location along the first axis, the current plane being substantially perpendicular to the first axis; (iv) measuring atomic force interactions exerted on the AFM tip at various locations in the geometric pattern to determine a new optimum location in the geometric pattern where the atomic force interactions are at a minimum; and (v) moving the AFM tip within the current plane to the new optimum location. The method may further include the step of calculating a depth of the deep feature after the AFM tip reaches the bottom of the deep feature. The deep feature may be a trench formed in a semiconductor wafer while fabricating a capacitor for an integrated circuit, for example. Hence, the method may be used to test an integrated circuit device during production.

In accordance with another aspect of the present invention, a method of scanning a deep feature extending into a surface using an AFM tip is provided. This method includes the following steps. First, the deep feature is located and mapped with a surface survey scan. Second, data from the surface survey scan is analyzed to identify an initial optimum location for probing into the deep feature with the AFM tip. Third, the AFM tip is moved to the initial optimum location approximately at surface level. Fourth, a first procedure is repeated until the AFM tip reaches a bottom of the deep feature. The first procedure includes the following steps: (a) lowering the AFM tip in a first direction parallel with a first axis extending into the deep feature by a first distance increment; (b) measuring atomic force interactions exerted on the AFM tip to determine whether the bottom of the deep feature has been reached; (c) moving the AFM tip in a geometric pattern and within a current plane at a current location along the first axis the current plane being substantially perpendicular to the first axis; (d) measuring atomic force interactions exerted on the AFM tip at various locations in the geometric pattern to determine a new optimum location in the geometric pattern where the atomic force interactions are at a minimum; and (e) moving the AFM tip within the current plane to the new optimum location. Fifth, a depth of the deep feature is calculated after the AFM tip reaches the bottom of the deep feature. A second procedure used for exiting the AFM tip from the deep feature and moving across the surface includes the following steps: (a) First raise the tip so it is not in-contact with the surface. (b) Move the AFM tip in the second direction parallel to the surface, which is towards the next location set for measuring the surface height. (c) Repeating the second movement increment until the AFM tip reaches the next location or nears an object on the surface. (d) If an object is encountered then move one increment in reverse to the second movement. (e) Repeat step second procedure a-d until the next location is reached. This method also may be used to test an integrated circuit device during production.

In accordance with yet another aspect of the present invention, a method of fabricating an integrated circuit device is provided. The method includes the following steps. First, a trench is formed in a semiconductor wafer. The trench extends into a surface of the wafer. Second, a depth of the trench is measured using a method of scanning the trench with an atomic force microscopy (AFM) tip. The method of scanning includes: (i) locating and mapping the trench with a surface survey scan; (ii) analyzing data from the surface survey scan to identify an initial optimum location for probing into the trench with the AFM tip; (iii) moving the AFM tip to the initial optimum location approximately at surface level; and (iv) repeating a first procedure until the AFM tip reaches a bottom of the trench, the first procedure including: (a) lowering the AFM tip in a first direction into the trench by a first distance increment, (b) measuring atomic force interactions exerted on the AFM tip to determine whether the bottom of the trench has been reached, (c) moving the AFM tip in a geometric pattern and within a current plane at a current location along the depth His axis the current plane being that are perpendicular to the first axis, (d) measuring atomic force interactions exerted on the AFM tip at various locations in the geometric pattern to determine a new optimum location in the geometric pattern where the atomic force interactions are at a minimum, and (e) move the AFM tip within the current plane to the new optimum location. The trench may be partially filled with polysilicon before measuring the depth of the trench. This method may further includes the steps of: plotting a top view of an approximate trench outline based on the analysis of the surface survey scan, and/or plotting an approximate center location of the trench outline based on the analysis of the surface survey scan. Also, this method may further include: calculating a depth of the trench after the AFM tip reaches the bottom of the trench and displaying the depth proximate to the plot of the trench outline. Hence, an integrated circuit device may be tested during production using this method.

BRIEF DESCRIPTION OF THE DRAWINGS

The above features of the present invention will be more clearly understood from consideration of the following descriptions in connection with accompanying drawings in which:

FIG. 8 shows a cross-section view of the trench of FIG. 6 as it is being scanned by an AFM tip;

FIGS. 9–13 show the AFM tip at various stages as it is lowered into the trench in accordance with the scanning method of the preferred embodiment;

FIG. 21 shows the AFM tip in a tilted configuration;

FIG. 22 shows an AFM tip being deflected and sticking to a sidewall of a trench;

FIG. 23 shows an example of scan results when there is tip sticking; and

FIG. 24 shows a carbon nanotube AFM tip at the bottom of a trench.

DETAILED DESCRIPTION OF PREFERRED EMBODIMENTS

Figure 1:
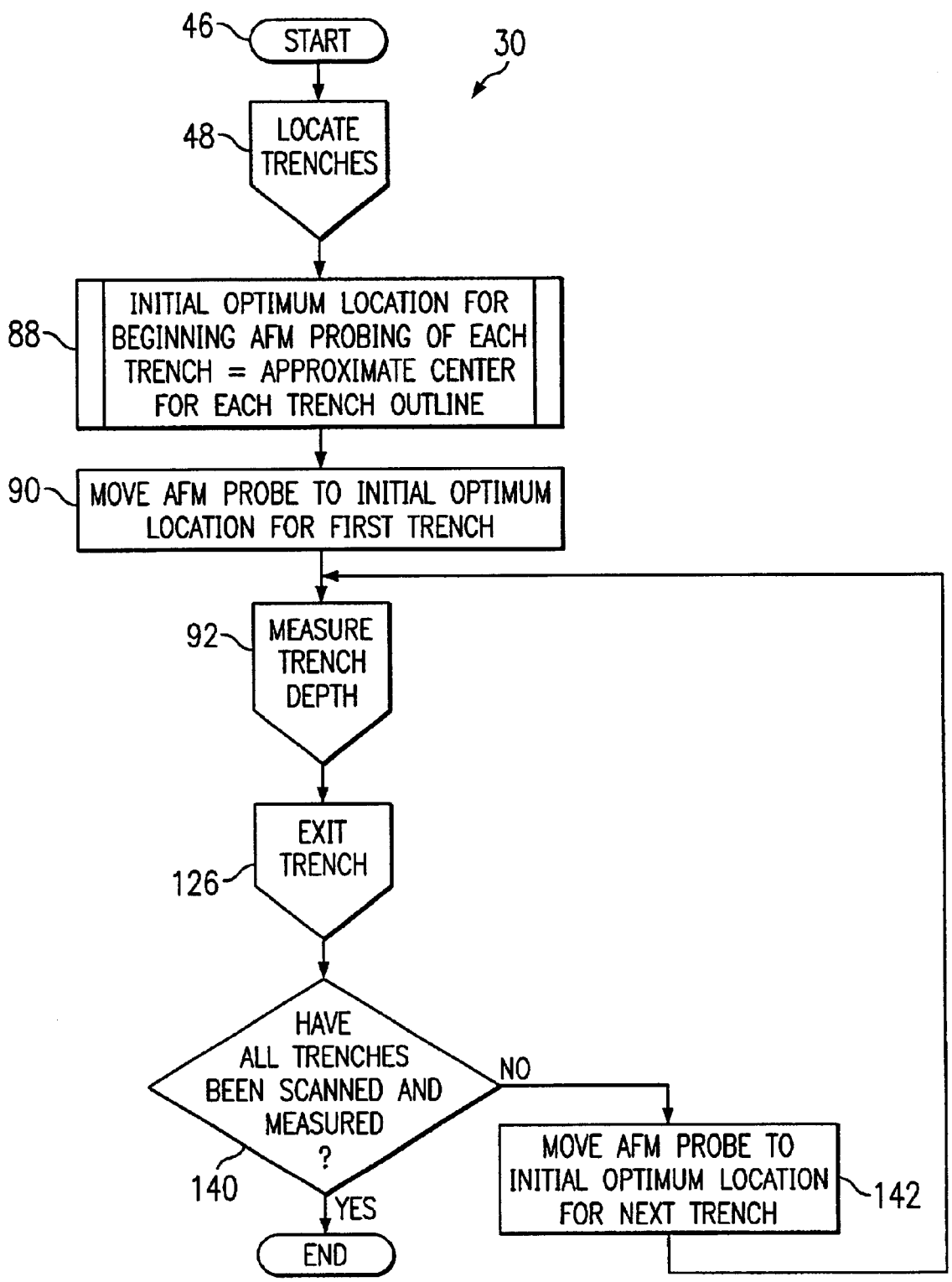
FIG. 1 shows a pseudo code flowchart for a main program for an AFM depth measurement scanning method in accordance with a preferred embodiment of the present invention.

Referring now to the drawings, wherein like reference numbers are used herein to designate like elements throughout the various views, a preferred embodiment of the present invention is illustrated and described. As will be understood by one of ordinary skill in the art, the figures are not necessarily drawn to scale, and in some instances the drawings have been exaggerated and/or simplified in places for illustrative purposes only. One of ordinary skill in the art will appreciate the many applications and variations of the present invention in light of the following description of the preferred embodiment of the present invention. The preferred embodiment discussed herein is an illustrative example of the present invention and does not limit the scope of the invention to the preferred embodiment described.

Figure 2:
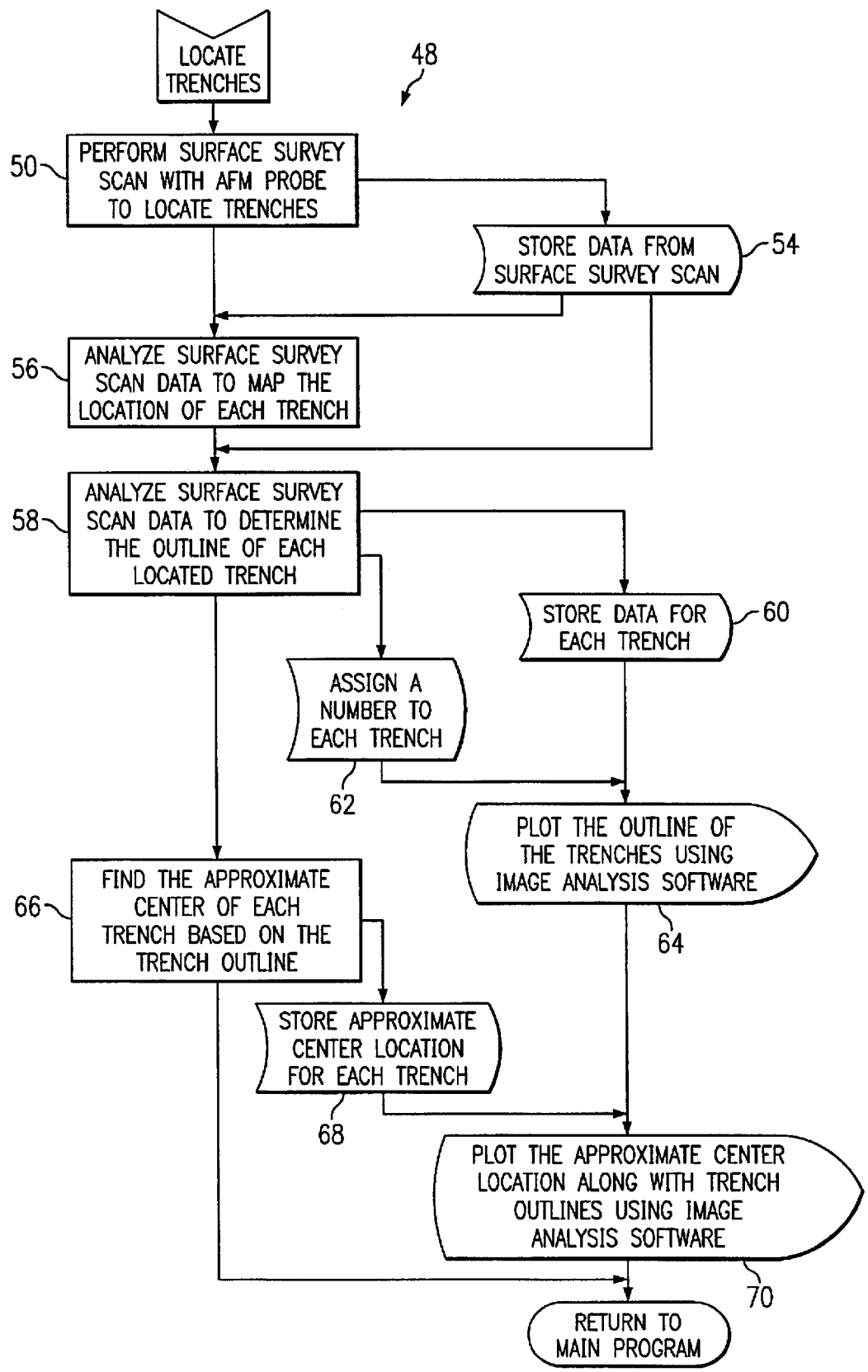
FIG. 2 shows an image analysis subroutine of the main program to locate each trench center location FIG. 1.
Figure 3:
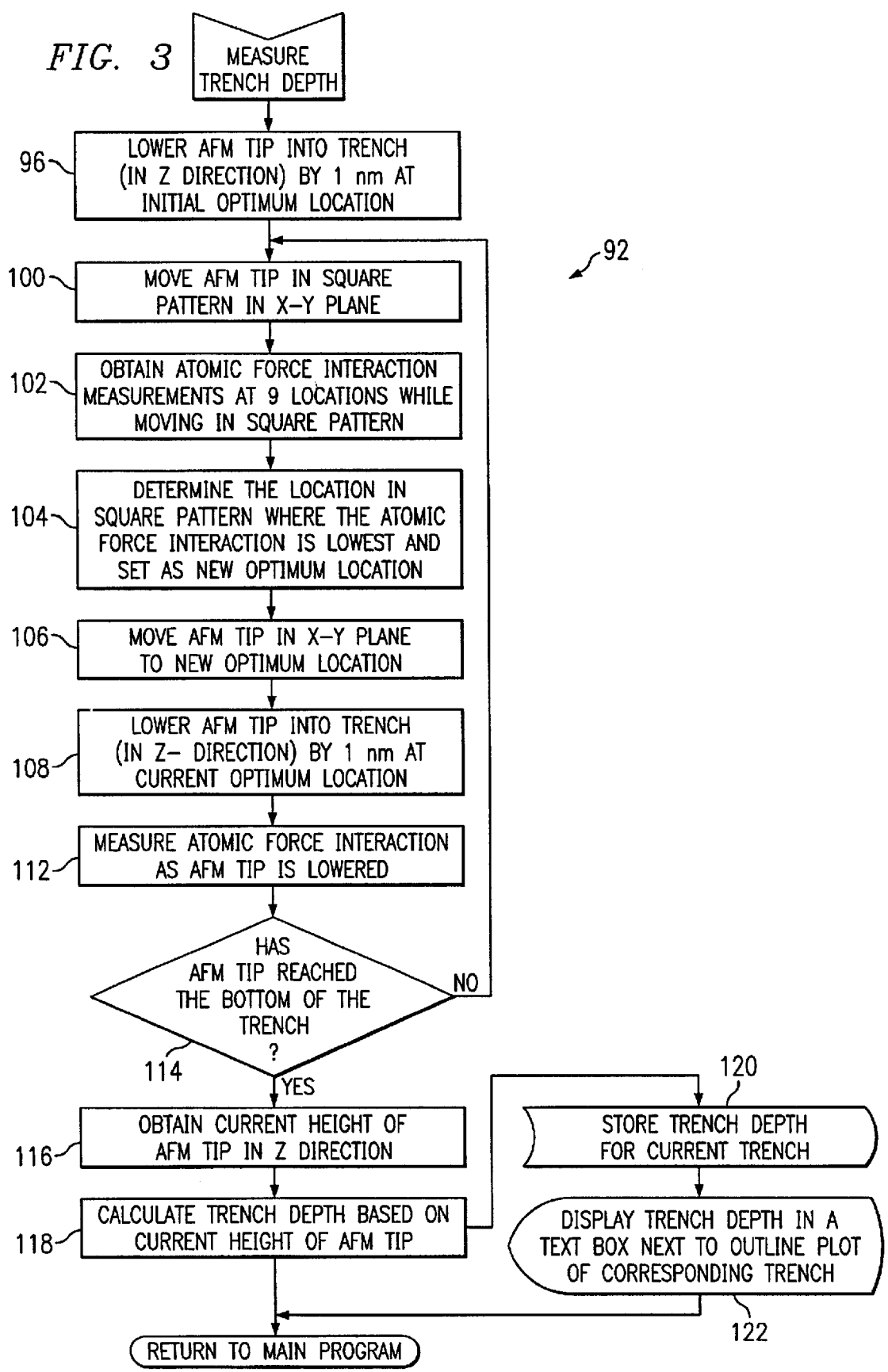
FIG. 3 shows another subroutine of the main program of FIG. 1 used for measuring the trench depth.
Figure 4:
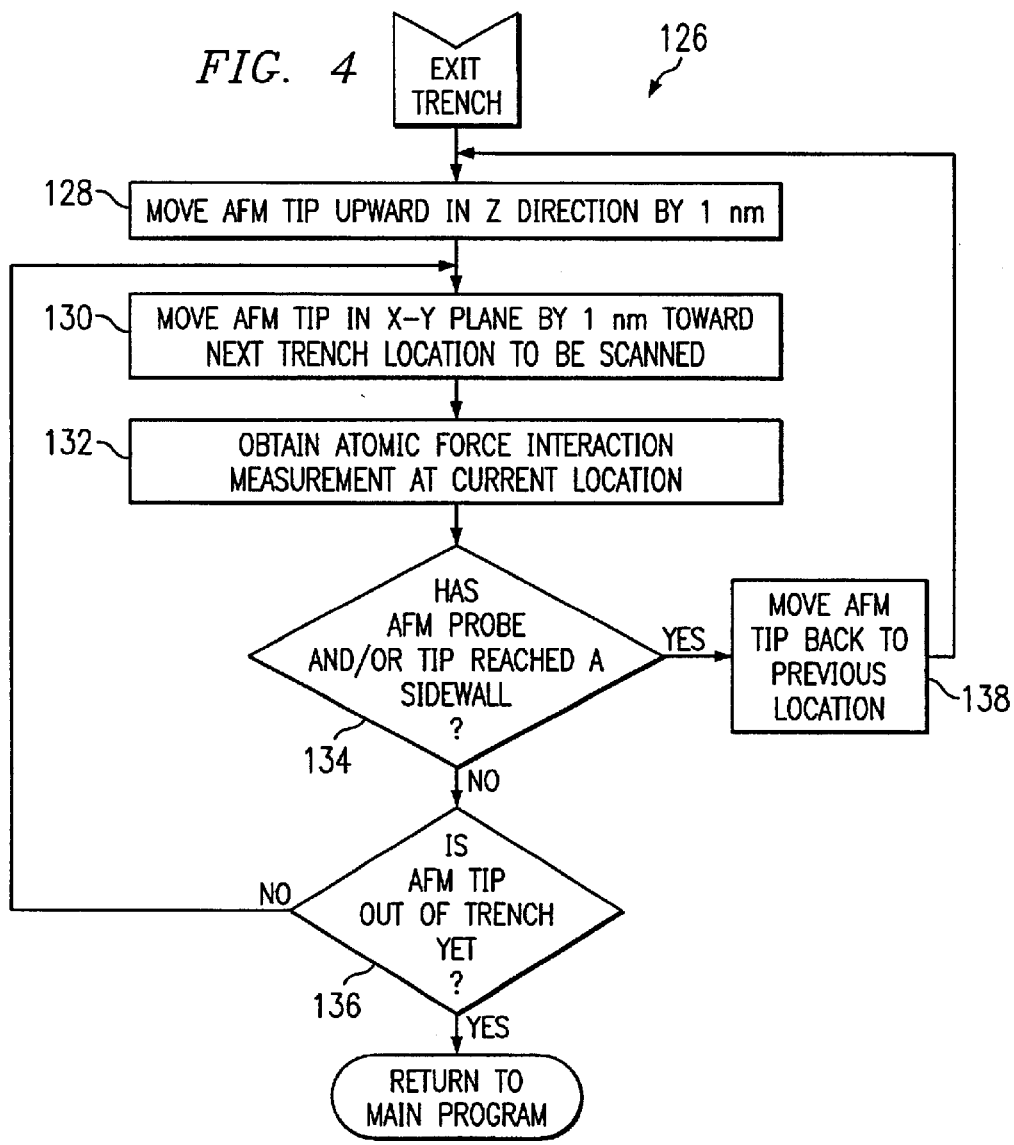
FIG. 4 shows yet another subroutine of the main program of FIG. 1 for exiting a trench.

Generally, an embodiment of the present invention provides an atomic force microscopy ("AFM" hereinafter) scanning method that is useful in evaluating deep features of a semiconductor products, for example. A first scanning method embodiment of the present invention is illustrated by the flowcharts shown in FIGS. 1–4. The first scanning method embodiment may be incorporated into a computer program adapted to execute on a computer system, which controls the movement of an AFM tip. The computer system may be part of a commercially available AFM testing machine, for example. Hence, the flowcharts of FIGS. 1–4 may be considered pseudo code for the computer program. The particular computer language used to implement the logic and instructions shown in FIGS. 1–4 may vary, depending on a programmer's preference and/or depending on the computing device of an embodiment. FIG. 1 illustrates a main program 30. FIGS. 2–4 illustrate subroutines called upon by the main program.

Figure 5:
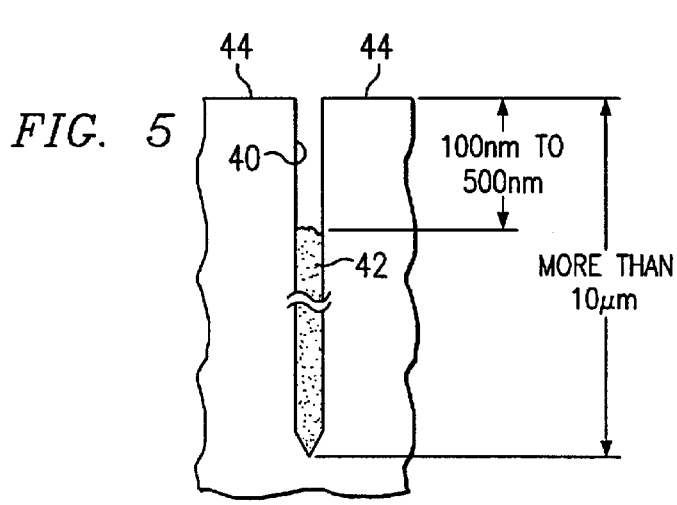
FIG. 5 shows a typical deep: trench pattern formed in a wafer surface of a semiconductor product.

In evaluating trenches formed in a surface of a semiconductor product, one objective is to measure the depth of partially filled trenches. FIG. 5 shows a simplified cross-section view of a deep trench 40 that is partially filled with polysilicon 42 for forming a capacitor, for example. A typical empty trench depth may be more than 10 microns from the surface 44, and a typical partially filled trench 40 may be about 100–500 nm deep, for example. The deep trench 40 of FIG. 5 is just one example of a deep feature that may be measured using the first embodiment.

Beginning in the flow chart of FIG. 1 at the "Start" block 46 of the main program, the first step is to locate and map out the trenches. The main program 30 calls upon the Locate Trenches subroutine 48, which is illustrated in FIG. 2. For the Locate Trenches subroutine 48 of FIG. 2, a surface survey scan with the AFM tip is performed to locate the trenches (action block 50 in FIG. 2). As a point of reference, X-Y planes are substantially parallel to the surface 44 of the semiconductor product, and the trenches 40 generally extend in a Z direction into the surface 44. The X-Y-Z coordinates based on the Cartesian coordinate system with the Z-axis extending into, along, and generally parallel with the sidewalls 94 of the deep trench 40 is preferred for simplicity.

For the surface survey scan, the AFM tip is moved about the surface within an X-Y plane or planes just above the surface while atomic force interaction measurements are taken using a conventional imaging mode (e.g., tapping mode). The atomic force interactions may be detected from the deflections of the AFM tip, as measured using a conventional means for example (e.g., reflecting a laser beam 53 off of the top or back of the AFM cantilever 55 as shown in FIG. 8 and catching the reflections with a charge-coupled device or CCDI sensor). However, other more advanced and more sensitive testing modes and/or detection means may be incorporated as well to further improve the test results. The data obtained from the surface survey scan is stored in a storage device (e.g., RAM and/or disc drive) of the computer system (action block 54 in FIG. 2).

Next, the image data from the surface survey scan is analyzed to map the location of each trench (action block 56 in FIG. 2) and to find the approximate center of each trench. The data may be analyzed on-the-fly as it is being obtained or analyzed later using the stored data, depending on the capacity of the computer system and/or the time constraints on the testing procedure. The surface survey scan data is then processed using a thresholding technique (action block 58). With the thresholding technique, data points from the surface scan exceeding a threshold depth are assigned a first value (e.g., binary 1) and any data points below the threshold are assigned a second value (e.g., binary 0). Immediately adjacent points having the first value assigned are grouped together to "fill-in" the trenches and each group of values is assigned an identification number (e.g., trench #1, trench #2, etc.) (action block 62). Isolated data points or groups of data points touching the boundary or edge of the scan range are disregarded and reassigned with the second value, as they are probably not trenches.

Figure 6:
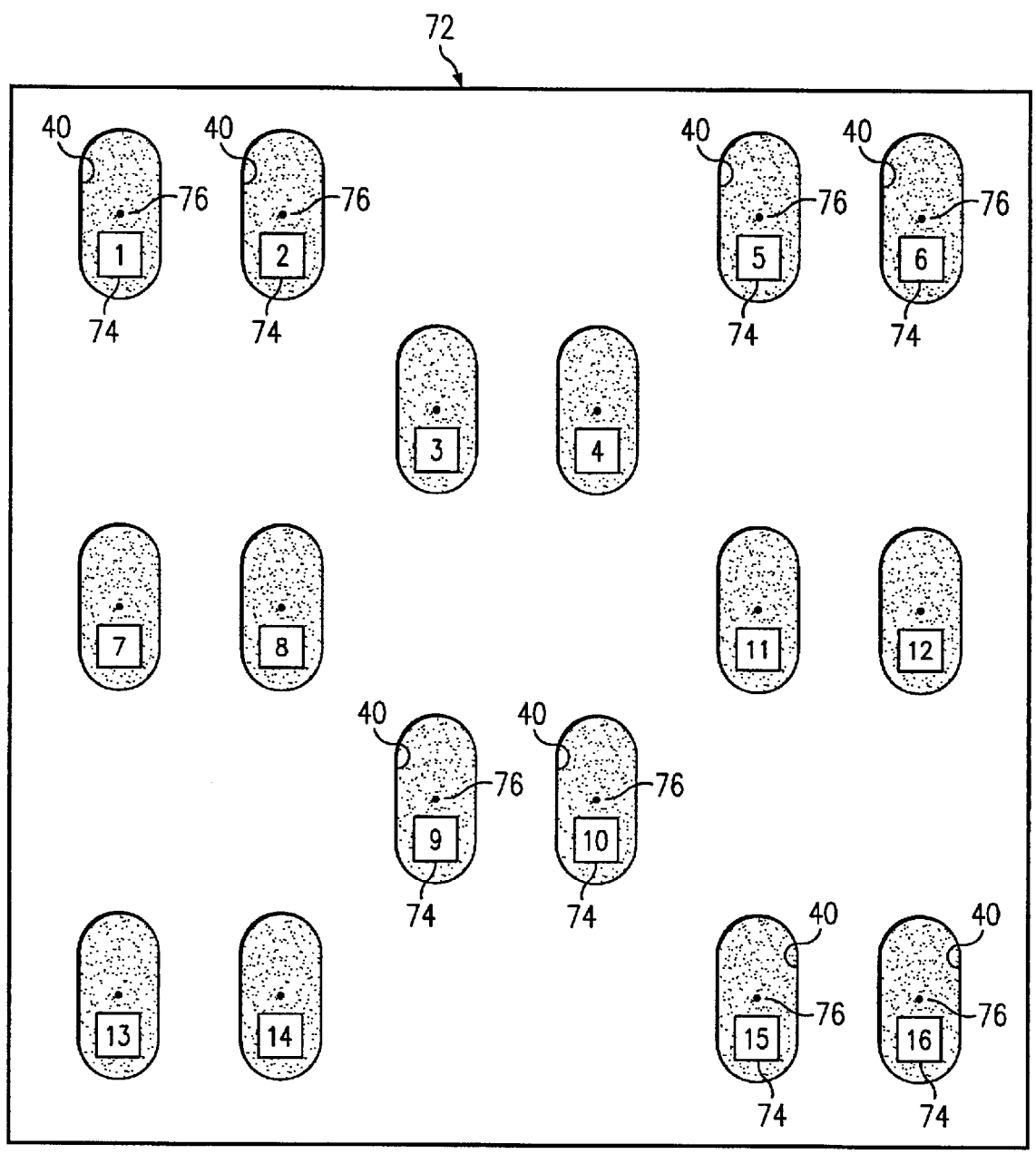
FIG. 6 shows a simplified screen shot of what may be displayed during an AFM depth measurement scan.

After each trench is filled in and the data points are grouped, the outline of the trench can be determined and mapped. The data for each trench may be stored (action block 60). Also, the outlines of the trenches 40 may be plotted on-screen to display the progress to an operator of the AFM machine (action block 64), as shown in FIG. 6 for example. Next, the approximate center for each trench is found (action block 66) and the approximate center location is stored in a storage device of the computer system for each trench (action block 68). The approximate center location 76 also may be plotted (action block 70), as also shown in FIG. 6. Using the data acquired from the thresholding technique, the area and elliptical diameter of each trench may be determined and stored as well (e.g., at action block 58).

FIG. 6 shows a simplified screen shot 72 of what may be displayed during an AFM depth measurement scan. In FIG. 6, a top view of the located trenches 40 is shown. The outline of each trench 40, the number 74 assigned to each trench 40, and the approximate center 76 of each trench are shown in the screen shot 72 of FIG. 6. Other information, such as the elliptical diameter and/or the area of each trench also may be displayed. Because the AFM machine running software according to the first embodiment and being controlled in accordance to the first embodiment is preferably fully automatic and automated (i.e., not needing human intervention to complete the measurement procedures), the on-screen plotting is an optional feature that may not be desired or needed. Other information and data may be provided onscreen as well.

Figure 7:
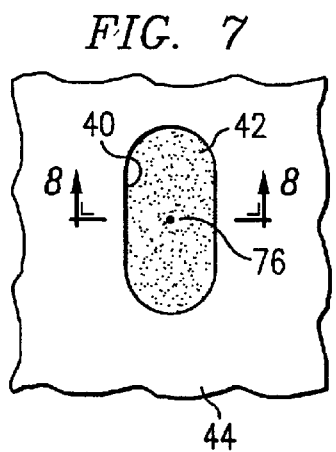
FIG. 7 shows a top view of a trench formed in a surface of a semiconductor product.

FIG. 7 shows a top view of a trench 40 on a surface 44 of a semiconductor product. The approximate center location 76 of the trench 40 is shown for purposes of illustration. FIG. 8 shows a simplified cross-section view of the trench 40 of FIG. 7 as taken along line 8-8. FIG. 8 illustrates a possible scan path of an AFM tip 80 during the surface survey scan. The phantom line showings of the AFM tip 82 illustrate the prior positions of the AFM tip 80 as it scans across the top of the surface 44. Preferably, during the surface survey scan, the AFM tip apex 84 only slightly lowers into the trenches 40. The changes in the atomic force interactions exerted on the AFM tip 80 as it goes across one part of the surface 44, over the trench 40, and across another part of the surface 44 (as shown in FIG. 8) will reveal the locations of the trenches 40. Thus, the regions of lower atomic force interactions as the AFM tip apex 84 scans across the surface 44 and over the trenches 40 will generally correlate to the locations of the trenches 40. Then from the surface survey scan, the outline of the trenches 40 and the center location 76 of each trench 40 may be approximated and mapped.

After the Locate Trenches subroutine 48 (FIG. 2) is completed, the subroutine 48 returns to the main program 30 (FIG. 1). As noted in block 88, the initial optimum location for beginning AFM depth measurement of each trench 40 is the approximate center location 76 for each trench outline. However, in other embodiments of the present invention, the initial optimum location may be different than the approximate trench center 76 because of tip angle or asymmetric shape of a trench 40. To begin the AFM depth measurement of the trenches, the AFM machine (not shown) is commanded to move the AFM tip 80 to the initial optimum location 76 for the first trench 40 to be measured (action block 90 in FIG. 1). For example, the trench 40 assigned as number one (see FIG. 6) may be measured first, followed by trench two, trench three, etc. However, other sequences may be used. For example, it may be desirable to move from trench six in FIG. 6 to trench twelve, and then to trench eleven, instead of moving from trench six to trench seven, because trench seven is farther away from trench six than trench twelve. Hence, the trenches 40 may be measured in any chosen or arbitrary order. At this stage, an optional tip offset process may be performed to determine the actual tip angle and to set the tip angle to a preferred angle. This optional tip offset process is not discussed herein, as it is the subject of another invention by the same inventor.

FIG. 9 shows the AFM tip 80 positioned with the AFM tip apex 84 approximately at the center location 76 of the entrance to the trench 40. The AFM tip 82 shown in phantom lines in FIG. 9 is precisely at the approximate center location 76 where the AFM machine attempt to move the AFM tip 80. But due to thermal variations and/or inaccuracies in actuating the AFM tip 80 at this size scale, the actual location of the AFM tip apex 84 compared to the location where the AFM machine was supposed to move the AFM tip to, may vary by as much as twenty percent. Thus, for purposes of illustration, FIG. 9 is showing a worst-case scenario.

The next step in the main program 30 of FIG. 1 is to call upon the Measure Trench Depth subroutine 92, which is illustrated in the flowchart of FIG. 3. The AFM tip 80 may be simply lowered into the trench 40 in the Z direction. However, without controlling the path of the AFM tip 80 as it goes into the trench 40, the AFM tip 80 and/or the AFM tip apex 84 may crash into a sidewall 94 or may be dragged across an inner surface of the trench 40, which is often one of the causes of wear or breakage of AFM tips 80. Hence, it would be more desirable to control the path of the AFM tip apex 84 as it enters the trench 40 to reduce wear on the AFM tip 80 and to reduce the number of tip fractures. Such reductions in wear and breakage may greatly extend the useful life of an AFM tip 80. The first embodiment of the present invention provides a way to control the path of the AFM tip 80 as it enters a deep feature (e.g., a trench 40).

Referring to FIG. 3, the AFM tip 80 is lowered into the trench 40 in the Z direction by about 1 nm (action block 96).

FIG. 10 illustrates this lowering movement. The phantom line showing of the AFM tip 82 in FIG. 10 represents the prior position of the AFM tip 80, as shown in FIG. 9. Although 1 nm lowering increments are used in this embodiment, other increments may be used. Next, the AFM tip apex 84 is moved in a square pattern 98 in the X-Y plane at the current Z location (action block 100 in FIG. 3). Hence, at each different X-Y location there may be a different force against the tip. At each different Z location along a Z axis extending into the trench 40, there is a different X-Y plane. The square pattern 98 is illustrated in FIG. 11. A first atomic force interaction measurement is taken at the location shown in FIG. 10, which is indicated by the number 1 in the square 98 of FIG. 11. Then, the AFM tip apex 84 is moved to eight other locations in the square pattern 98 within the X-Y plane, and an atomic force interaction measurement is taken at each location (indicated by numbers 1–9 in the square 98 of FIG. 11) (action block 102 in FIG. 3). Although a square pattern 98 is used in this embodiment (see FIG. 11), other scan patterns may be used to achieve an equivalent embodiment, including but not limited to a: circular pattern, elliptical pattern, rectangular pattern, rectangular with rounded corners pattern, triangular pattern, or hexagonal pattern, for example. Also, although nine measurements are taken in the first embodiment described herein, fewer or more measurements may be taken at this stage in other embodiments.

Referring again to FIG. 3, the location in the square scan pattern 98 (see FIG. 11) where the atomic force interactions exerted on the AFM tip 80 was the lowest is then determined (action block 104). This location in the square pattern with the lowest atomic force interaction may be set as the new optimum location for probing into the trench (action block 104). When all or most of the locations indicate no tip to sample atomic force interaction then the center location of the pattern 98 may be used for the new optimum location.

With the new optimum location determined, the AFM tip apex 84 is then moved within the current X-Y plane to the new optimum location (action block 106 in FIG. 3). Next, the AFM tip apex 84 is lowered in the Z direction by about 1 nm while positioned at the new optimum location in the X-Y plane (action block 108). These movements are illustrated in FIG. 12. In FIG. 12, the AFM tip 82 shown in phantom lines represents the prior location of the AFM tip 80 (as in FIG. 10).

Referring again to FIGS. 3 and 12, as the AFM tip apex 84 is lowered in the Z direction, the atomic force interactions exerted on the AFM tip 80 are monitored by the computer system (not shown) (action block 112). When the bottom 110 of the trench 40 is reached, there should be a dramatic increase (i.e., a spike) in the atomic force interactions. Thus, monitoring the atomic force interactions exerted on the AFM tip 80 while it is lowered should indicate when the bottom 110 of the trench 40 is reached by the AFM tip apex 84. Hence, in the logic sequence of FIG. 3, there is an inquiry as to whether the AFM tip apex 84 has reached the trench bottom 110 yet (decision block 114).

As shown in FIG. 3, if the trench bottom 110 has not been reached yet by the AFM tip apex 84, the steps of moving in the square pattern 98 (action block 100), obtaining nine measurements (action block 102), determining the new optimum location (action block 104), moving the AFM tip apex 84 to the new optimum location (action block 106), lowering the AFM tip apex 84 by another 1 nm increment (action block 108), and measuring the atomic force interaction exerted on the AFM tip. 80 are repeated. When the AFM tip apex 84 reaches the bottom 110 of the trench 40 (or when the AFM tip apex 84 has reached as deep as it possibly can, i.e., if the tip 80 is not long enough and narrow enough to reach the trench bottom 110), the current height of the AFM tip apex 84 in the Z direction may be retrieved from the AFM machine encoders (not shown) (action block 116 of FIG. 3). With this height information, the depth of the trench 40 may be calculated (action block 118) and stored in a storage device within the computer system (action block 120).

Figure 13:
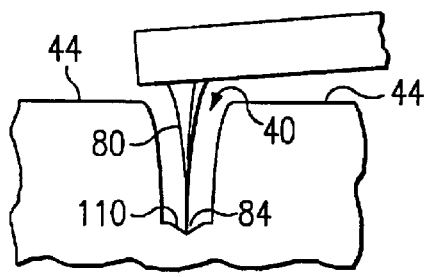

FIG. 13 illustrates a centered position of the AFM tip 80 when it reaches the bottom 110, which is often the maximum depth within the divot. For some semiconductor products the preferred measurement is the depth where the polysilicon 42 at the bottom comes in contact with the sidewall. In other cases it is desired to know the maximum depth near the center (within the divot). However, depending on the contour of the trench bottom 110 and tip angle (see e.g., FIG. 21), the deepest part of the trench measured may not be at or near the center of the trench 40.

As the trench depth measurements are obtained for each trench 40, they may be displayed on-screen next to the corresponding trench outline using a software window display box to show the progress to the operator of the AFM machine (see e.g., FIG. 20) (action block 122 in FIG. 3). However, because the scanning and probing is preferably fully automated (i.e., not needing human commands or interaction), such intermediate display may be optionally displayed based on the operators desire or need and such intermediate display is not necessary for an embodiment.

After the Measure Trench Depth subroutine 92 (FIG. 3) is completed, the subroutine 92 returns to the main program 30 (FIG. 1). The next step in the main program 30 (see FIG. 1) is to call upon the Exit Trench subroutine 126, which is shown in FIG. 4. At this stage, the AFM tip 80 is finished moving into the current trench 40 (see e.g., FIG. 13) and needs to be removed from the trench 40 (i.e., exiting the trench 40). The AFM tip 80 may be simply lifted out of the trench 40. However, without controlling the exit from the trench 40, the AFM tip 80 and/or the AFM tip apex 84 may hit a sidewall 94 or may be dragged across an inner surface of the trench 40, which is often one of the causes of wear or breakage of AFM tips 80. Hence, it would be more desirable to control the path of the AFM tip 80 as it exits the trench 40 to again reduce wear on the AFM tips 80 and to reduce the number of tip fractures. Such reductions in wear and breakage may greatly extend the useful life of an AFM tip 80. The first embodiment of the present invention provides a way to control the path of the AFM tip 80 as it exits a deep feature (e.g., a trench 40).

Figure 14:
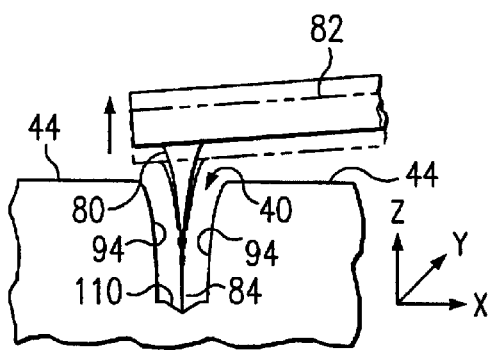
FIGS. 14–19 show the AFM tip at various stages as it exits the trench in accordance with the scanning method of the preferred embodiment.

Referring to FIG. 4, the first step of the Exit Trench subroutine is to move the AFM tip 80 upward in the Z direction (action block 128 in FIG. 4), i.e., in a direction along the Z axis toward the trench opening, by about I nm as illustrated in FIG. 14. In FIG. 14, the AFM tip 82 shown in phantom lines represents the previous position of the AFM tip 80 (as in FIG. 13). Next, the AFM tip 80 is moved in the current X-Y plane by about 1 mm in a direction toward the next initial optimum location for the next trench to be scanned (action block 130). After moving or while moving the AFM tip 80, a measurement of the atomic force interactions exerted on the AFM tip 80 is obtained (action block 132). Based on the level of atomic force interactions exerted on the AFM tip 80, it can be determined approximately how close the AFM tip 80 is to a sidewall 94 of the trench 40.

Figure 15:
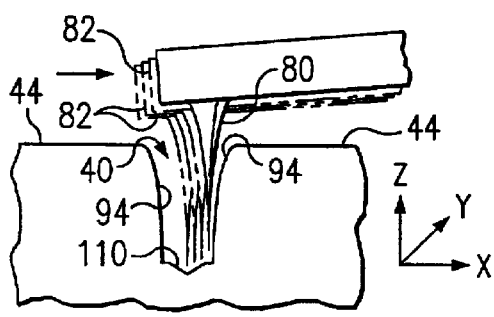

Still referring to FIG. 4, it is next determined whether the AFM tip 80 and/or the AFM tip apex 84 has reached a sidewall 94 (decision block 134). If not, it is determined whether the AFM tip apex 84 is out of the trench 40 yet (decision block 136). If the AFM tip apex 84 is not yet out of the trench 40, then the subroutine 126 continues (see FIG. 4). Because a sidewall 94 has not been reached yet, the following steps are repeated: the AFM tip 80 is moved in the current X-Y plane by about 1 nm toward the next initial optimum location for the next trench 40 to be scanned (action block 130), an atomic force interaction measurement is obtained (action block 132), and it is again determined whether the AFM tip 80 has reached a sidewall 94 yet (decision block 134). Hence, the looping of subroutine 126 of FIG. 4 continues until a sidewall 94 is reached (or until it is determined that the AFM tip apex 84 has exited the trench 40). This movement in the X-Y plane is illustrated in FIG. 15. The phantom lined AFM tips 82 in FIG. 15 represent the prior positions of the AFM tip 80 as it moves toward the sidewall 94.

Figure 16:
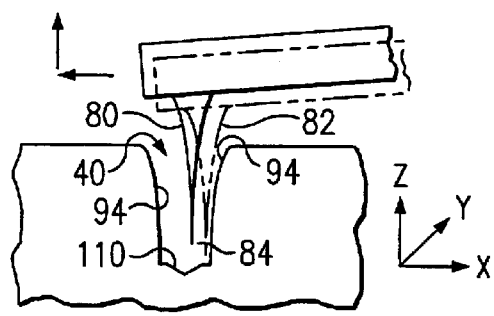
Figure 17:
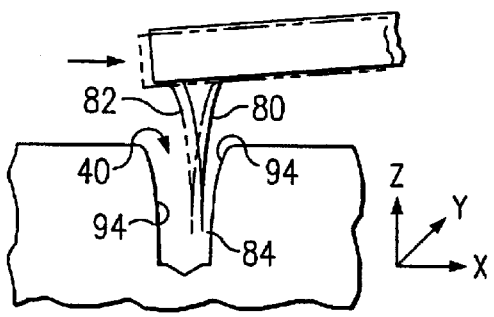
Figure 18:
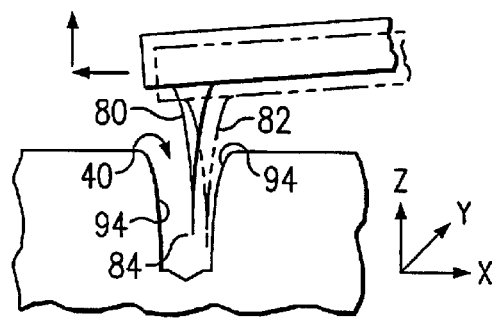
Figure 19:
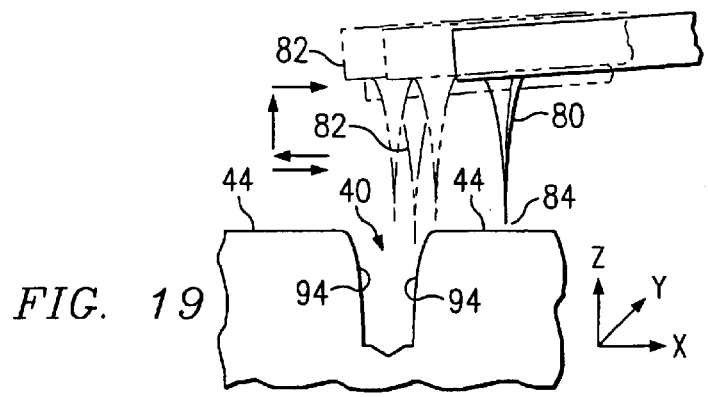

When a sidewall 94 is reached by the AFM tip 80, the AFM tip 80 is moved back to its previous position (where it was before the sidewall 94 was encountered) (action block 138 in FIG. 4). Then, the subroutine 126 begins looping again. The AFM tip apex 84 is moved upward again in the Z direction by about 1 nm (action block 128). FIG. 16 illustrates the path of the AFM tip 80 as it moves back to its previous position and then upward in the Z direction by another increment. Note that the increment distance moved by the AFM tip 80 in the Z direction and in the X-Y planes may differ from 1 nm. Also, the increment distance moved by the AFM tip 80 in the X-Y plane may differ from the increment distance moved in the Z direction. FIG. 17 illustrates the next movement of the AFM tip 80 in the X-Y plane at the next Z position. FIG. 18 illustrates the next movement back and up after the sidewall 94 is reached again. The process of moving the AFM tip 80 in increments in an X-Y plane until the sidewall 94 is reached, moving back to a previous position in the X-Y plane, and moving upward in increments in the Z direction continues until the AFM tip apex 84 is out of the trench 40. FIG. 19 illustrates the movement up to and when the AFM tip apex 84 is out of the trench 40.

There are a number of ways the software may determine that the AFM tip apex 84 is out of the trench 40. For example, the software may watch for the height in the Z direction where the AFM tip apex 84 should be out of the trench 40. As another example, if the AFM tip apex 84 moves in the X-Y plane beyond the coordinates known for the approximate outline of the trench 40, it may be assumed that the AFM tip apex 84 is out of the trench 40. Or the software may use a combination of such checks. After it is determined that the AFM tip apex 84 is out of the trench 40 (i.e., after the Exit Trench subroutine 126 (FIG. 4) is completed, the subroutine 126 returns to the main program 30 (FIG. 1).

Figure 20:
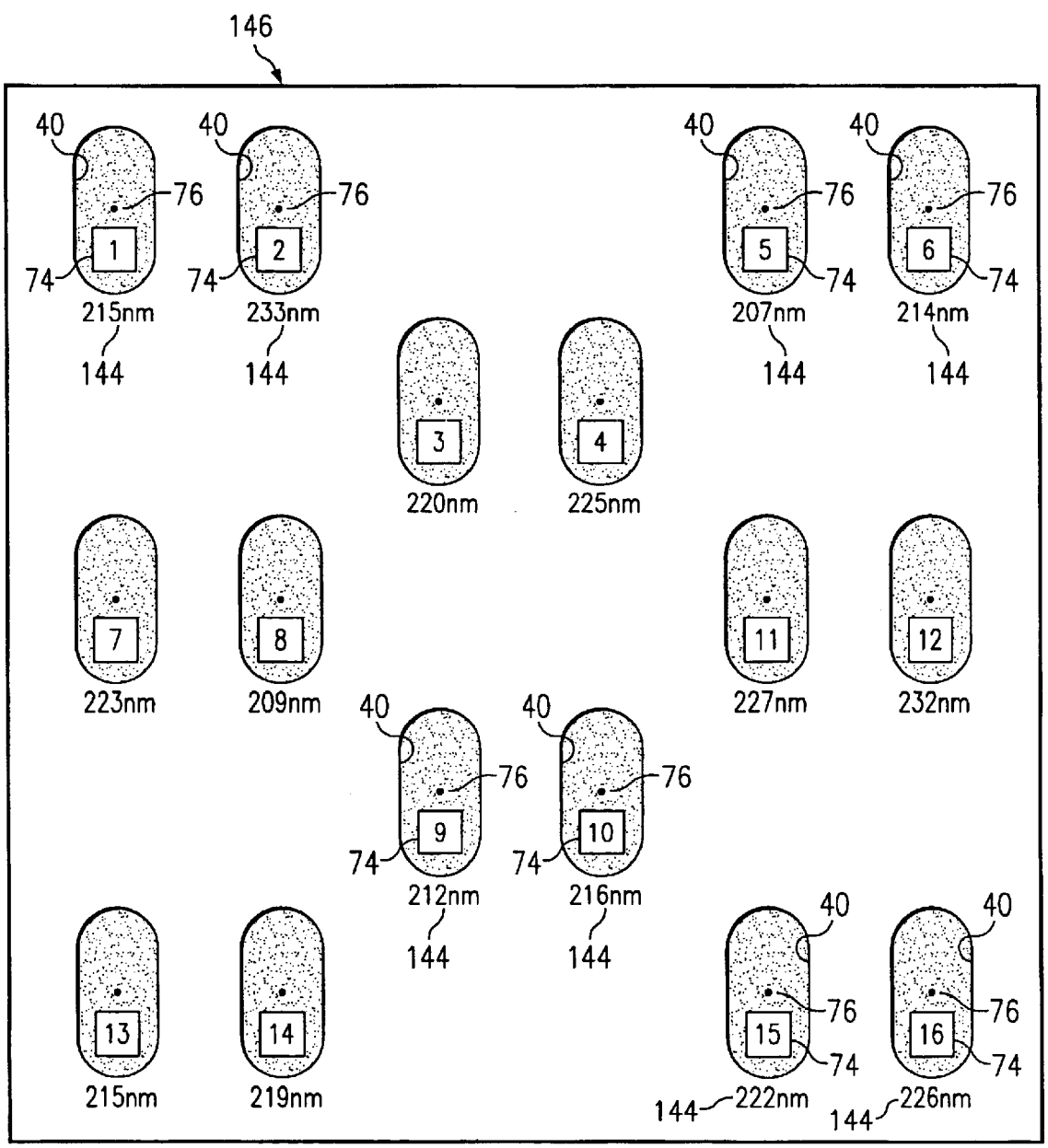
FIG. 20 shows a simplified screen shot of what may be displayed after the AFM tip makes the depth measurements.

Referring to the main program 30 in FIG. 1 again, the next step is to determine whether all of the trenches 40 that are scanned have been measured (decision block 140). If not, the AFM tip 80 is moved to the initial optimum location 76 for the next trench 40 to be scanned and measured (action block 142). Then, the Measure Trench Depth and Exit Trench subroutines 92 and 126 are performed again. This process may be repeated until all of the trenches 40 are scanned and measured. As the trenches 40 are scanned, the progress of the measurements may be shown on-screen as the data is obtained. Also or in alternative, after all the trenches 40 are scanned and measured, the depth measurements 144 may be displayed on-screen and/or saved as an image for incorporating into a report. FIG. 20 shows a simplified screen shot 146 of what may be displayed after the AFM depth measurement scan. In FIG. 20, a top view of the located trenches 40 is shown. The outline of each trench, the number assigned 74 to each trench 40, the approximate center location 76 of each trench outline, and the depth measurement 144 for each trench 40 are shown in the screen shot 146 of FIG. 20. However, the on-screen display may vary from that shown in FIG. 20 by way of example.

As an added feature of the first embodiment, the depth measurements of the trenches may be compared to a standard AFM measurement or a Scanning Electron Microscope (SEM) cross-section to determine whether the depth of each trench is within tolerance according to the standard. An indicator may be plotted on-screen along side the depth display to indicate whether the trench depth is within the standard. Also, based on the number of trenches not meeting the standard, the semiconductor product being produced may be rejected or accepted for continuation in the manufacturing process.

The first embodiment of the present invention may also be used when the AFM tip 80 is tilted, as illustrated in FIG. 21 for example. In such case, the initial optimum location may not be at the center location 76 of the trench 40 because the AFM tip 80 is tilted. Also, as the tilted AFM tip 80 enters the trench 40, the point where there is the least atomic force interaction may not coincide with the geometric center location 76 of the trench 40 due to the AFM tip 80 being tilted. But, an embodiment of the present invention is still be useful for avoiding collisions with and dragging the tilted AFM tip apex 84 on the sidewalls 94 while entering and/or exiting the trench 40, which may extend the useful life of the AFM tips 80.

Tips with high aspect ratios may also be used with the present invention. High aspect ratio tips are designed to fit inside small diameter deep features. Examples of high aspect ratio tips include (Focused Ion Beam) FIB tips, (Electron Beam Deposition) EBD tips, and Carbon Nanotube tips, for example. High aspect ratio tips have an advantage over standard tapping mode tips because of their shape because such tips may be lowered into deep features without crashing into the sides. A disadvantage to using high aspect ratio tips is a "sticking effect." Because of their tip length, high aspect ratio tips may become stuck against the side easier due to atomic or static forces inside the deep trench deflecting the tip, as shown in FIG. 22. Then the tip becomes stuck, usually the tip must be move back in a direction out of the trench to release the tip and prevent tip breakage, which may result in scan results resembling that of FIG. 23. The first embodiment addresses this issue by keeping the tip in the center of the trench as it is lowered, which is where the atomic forces pull equally against all sides of the tip to reduce deflection to one side.

FIG. 24 shows a carbon nanotube tip that may be used with an embodiment of the present invention. An advantage of using a carbon nanotube tip is that the tip has a cylindrical shape which makes it easier to measure a critical depth where the polysilicon 42 in the bottom of the trench meets the sidewall of the trench (see FIG. 24). Another advantage of carbon nanotubes is their strength and durability, which helps them last longer than silicon tips. Still another advantage of using carbon nanotubes is their available lengths (due to the strength of their carbon structure).

Note that the subroutines 48, 92, and 126 may be broken up in different ways than that shown in FIGS. 1–4, or there may be no subroutines (i.e., all in the main program 30). With the benefit of this disclosure, one of ordinary skill in art will likely realize many variations of the present invention that may form many other embodiments of the present invention.

It will be appreciated by those skilled in the art having the benefit of this disclosure that an embodiment of this invention provides AFM depth measurement scanning methods that may be useful for evaluating deep features of semiconductor products, for example. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A method of scanning a deep feature extending into a surface using an atomic force microscopy (AFM) tip, comprising:
    locating and mapping the deep feature with a surface survey scan;
    analyzing data from the surface survey scan to identify an initial optimum location for probing into the deep feature with the AFM tip;
    moving the AFM tip to the initial optimum location approximately at surface level; and
    repeating a first procedure until the AFM tip reaches a bottom of the deep feature, the first procedure including:
        lowering the AFM tip in a first direction parallel with a first axis extending into the deep feature by a first distance increment;
        measuring atomic force interactions exerted on the AFM tip to determine whether the bottom of the deep feature has been reached;
        moving the AFM tip in a geometric pattern and within a current plane at a current location along the first axis, the current plane being substantially perpendicular to the first axis;
        measuring atomic force interactions exerted on the AFM tip at various locations in the geometric pattern to determine a new optimum location in the geometric pattern where the atomic force interactions are at a minimum; and
        moving the AFM tip within the current plane to the new optimum location.

2. The method of claim 1, further comprising:
    calculating a depth of the deep feature after the AFM tip reaches the bottom of the deep feature.

3. The method of claim 1, further comprising:
    repeating a second procedure until the AFM tip has exited the deep feature, the second procedure including:
        moving the AFM tip in a second direction parallel with the first axis by a second distance increment, wherein the second direction is opposite the first direction and generally heading towards the surface;
        repeating a third procedure until the AFM tip reaches a sidewall of the deep feature, the third procedure including:
            moving the AFM tip in a third direction by a third distance increment within the current plane; and
            measuring atomic force interactions exerted on the AFM tip to determine whether the sidewall of the deep feature has been reached; and
        moving the AFM tip in a fourth direction by the third distance increment within the current plane to an immediately previous position, wherein the fourth direction is opposite the third direction.

4. The method of claim 3, wherein the first, second, and third distance increments are each about 1 nm.

5. The method of claim 1, wherein the deep feature is a trench formed in a semiconductor wafer while fabricating a capacitor for an integrated circuit.

6. The method of claim 1, further comprising:
    plotting a top view of an approximate outline for the deep feature based on the analysis of the surface survey scan.

7. The method of claim 6, further comprising:
    plotting an approximate center location of the deep feature outline based on the analysis of the surface survey scan.

8. The method of claim 7, further comprising:
    calculating a depth of the deep feature after the AFM tip reaches the bottom of the deep feature; and
    displaying the depth proximate to the plot of the deep feature outline.

9. An integrated circuit device tested during production in accordance with the method of claim 1.

10. A method of scanning a deep feature extending into a surface using an atomic force microscopy (AFM) tip, comprising:
    locating and mapping the deep feature with a surface survey scan;
    analyzing data from the surface survey scan to identify an initial optimum location for probing into the deep feature with the AFM tip;
    moving the AFM tip to the initial optimum location approximately at surface level;
    repeating a first procedure until the AFM tip reaches a bottom of the deep feature, the first procedure including:
        lowering the AFM tip in a first direction parallel with a first axis extending into the deep feature by a first distance increment;
        measuring atomic force interactions exerted on the AFM tip to determine whether the bottom of the deep feature has been reached;
        moving the AFM tip in a geometric pattern and within a current plane at a current location along the first axis, the current plane being substantially perpendicular to the first axis;
        measuring atomic force interactions exerted on the AFM tip at various locations in the geometric pattern to determine a new optimum location in the geometric pattern where the atomic force interactions are at a minimum; and
        moving the AFM tip within the current plane to the new optimum location;
    calculating a depth of the deep feature after the AFM tip reaches the bottom of the deep feature; and
    repeating a second procedure until the AFM tip has exited the deep feature, the second procedure including:
        moving the AFM tip in a second direction parallel with the first axis by a second distance increment, wherein the second direction is opposite the first direction and generally heading towards the surface;
        repeating a third procedure until the AFM tip reaches a sidewall of the deep feature, the third procedure including:
            moving the AFM tip in a third direction by a third distance increment within the current plane; and measuring atomic force interactions exerted on the AFM tip to determine whether the sidewall of the deep feature has been reached; and moving the AFM tip in a fourth direction by the third distance increment within the current plane to an immediately previous position, wherein the fourth direction is opposite the third direction.

11. An integrated circuit device tested during production in accordance with the method of claim 10.

12. A method of fabricating an integrated circuit device, comprising:

forming a trench in a semiconductor wafer, the trench extending into a surface of the wafer; and measuring a depth of the trench using a method of scanning the trench with an atomic force microscopy (AFM) tip, the method of scanning including:

locating and mapping the trench with a surface survey scan;

analyzing data from the surface survey scan to identify an initial optimum location for probing into the trench with the AFM tip;

moving the AFM tip to the initial optimum location approximately at surface level; and repeating a first procedure until the AFM tip reaches a bottom of the trench, the first procedure including:

lowering the AFM tip in a first direction parallel with a first axis extending into the trench by a first distance increment;

measuring atomic force interactions exerted on the AFM tip to determine whether the bottom of the trench has been reached;

moving the AFM tip in a geometric pattern and within a current plane at a current location along the first axis, the current plane being substantially perpendicular to the first axis;

measuring atomic force interactions exerted on the AFM tip at various locations in the geometric pattern to determine a new optimum location in the geometric pattern where the atomic force interactions are at a minimum; and moving the AFM tip within the current plane to the new optimum location.

13. The method of claim 12, wherein the trench is partially filled with polysilicon before measuring the depth of the trench.

14. The method of claim 12, further comprising:

repeating a second procedure until the AFM tip has exited the trench, the second procedure including:

moving the AFM tip in a second direction parallel with the first axis by a second distance increment, wherein the second direction is opposite the first direction and generally heading towards the surface;

repeating a third procedure until the AFM tip reaches a sidewall of the trench, the third procedure including:

moving the AFM tip in a third direction by a third distance increment within the current plane; and measuring atomic force interactions exerted on the AFM tip to determine whether the sidewall of the trench has been reached; and moving the AFM tip in a fourth direction by the third distance increment within the current plane to an immediately previous position, wherein the fourth direction is opposite the third direction.

15. The method of claim 14, wherein the first, second, and third distance increments are each about 1 nm.

16. The method of claim 12, further comprising:

plotting a top view of an approximate outline for the trench based on the analysis of the surface survey scan.

17. The method of claim 16, further comprising:

plotting an approximate center location of the trench outline based on the analysis of the surface survey scan.

18. The method of claim 17, further comprising:

calculating a depth of the trench after the AFM tip reaches the bottom of the trench; and displaying the depth proximate to the plot of the trench outline.

19. An integrated circuit device tested during production in accordance with the method of claim 12.

* * * * *